(12) United States Patent
Mestan et al.

(10) Patent No.: US 10,725,928 B1
(45) Date of Patent: Jul. 28, 2020

(54) TRANSLATION LOOKASIDE BUFFER INVALIDATION BY RANGE

(71) Applicant: Apple Inc., Cupertino, CA (US)

(72) Inventors: Brian R. Mestan, Austin, TX (US); Pradeep Kanapathipillai, Santa Clara, CA (US); Joshua William Smith, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 16/243,901

(22) Filed: Jan. 9, 2019

(51) Int. Cl.
*G06F 12/08* (2016.01)
*G06F 12/0891* (2016.01)
*G06F 12/1045* (2016.01)

(52) U.S. Cl.
CPC ...... *G06F 12/0891* (2013.01); *G06F 12/1045* (2013.01); *G06F 2212/1044* (2013.01); *G06F 2212/683* (2013.01)

(58) Field of Classification Search
None
See application file for complete search history.

(56) References Cited

U.S. PATENT DOCUMENTS

| | | | | | |
|---|---|---|---|---|---|
| 5,491,806 A | * | 2/1996 | Horstmann | ......... | G06F 12/1027 711/207 |
| 5,946,717 A | * | 8/1999 | Uchibori | ............. | G06F 12/1036 711/207 |
| 6,560,689 B1 | * | 5/2003 | Mathews | ............ | G06F 12/1036 711/108 |
| 10,140,216 B2 | | 11/2018 | Williams et al. | | |
| 10,552,339 B2 | | 2/2020 | Basu et al. | | |
| 2005/0268045 A1 | * | 12/2005 | Siegel | ................. | G06F 12/1036 711/133 |
| 2007/0005932 A1 | * | 1/2007 | Covelli | ............... | G06F 12/1027 711/207 |
| 2010/0318762 A1 | * | 12/2010 | Malyugin | ........... | G06F 12/1027 711/207 |
| 2014/0173216 A1 | * | 6/2014 | Jayasena | ............. | G06F 12/0891 711/135 |
| 2014/0325167 A1 | * | 10/2014 | Siegel | ................. | G06F 12/0891 711/159 |
| 2015/0100753 A1 | * | 4/2015 | Shen | .................... | G06F 12/1009 711/207 |
| 2016/0140042 A1 | * | 5/2016 | Mukherjee | .......... | G06F 12/0891 711/123 |
| 2016/0283384 A1 | * | 9/2016 | Podaima | ............. | G06F 12/0862 |

(Continued)

*Primary Examiner* — Kevin Verbrugge
(74) *Attorney, Agent, or Firm* — Kowert Hood Munyon Rankin and Goetzel PC; Rory D. Rankin (57) ABSTRACT

A system and method for efficiently performing maintenance on a cache. In various embodiments, control logic in a cache controller or elsewhere receives an indication for invalidating a range of virtual-to-physical mappings in a given translation lookaside buffer (TLB). The logic determines a first latency to invalidate entries of the TLB based on a number of addresses in the range and a number of supported page sizes simultaneously stored in the TLB. The logic determines a second latency based on a number of entries in the TLB. If the first latency is greater, then the logic traverses through each TLB entry and invalidates TLB entries storing a virtual address within the range. If the first latency is smaller, then the logic traverses through each address in the range and invalidates TLB entries storing a virtual address within the range.

20 Claims, 7 Drawing Sheets

(56) References Cited

U.S. PATENT DOCUMENTS

2016/0350225 A1\* 12/2016 Podaima ............. G06F 12/0862
2018/0018280 A1\* 1/2018 Bradbury ............ G06F 12/1009
2019/0155747 A1 5/2019 Sandberg et al.

\* cited by examiner

TRANSLATION LOOKASIDE BUFFER INVALIDATION BY RANGE

BACKGROUND

Technical Field

Embodiments described herein relate to the field of computing systems and, more particularly, to efficiently performing maintenance on a cache.

Description of the Related Art

Generally speaking, a variety of computing systems include multiple processors and a memory, and the processors generate access requests for instructions and application data while processing software applications. The processors include a central processing unit (CPU), data parallel processors like graphics processing units (GPUs), digital signal processors (DSPs), multimedia engines, and so forth. Computing systems often include two or three levels of cache hierarchy for the multiple processors. Later levels in the hierarchy of the system memory include access via a memory controller to system memory. Data from recently accessed memory locations are stored within the caches. When the data is requested again, the data is sent to a cache controller to retrieve the requested data from a cache rather than from system memory.

Each of the processors utilize linear (or "virtual") addresses when processing the accessed data and instructions. A virtual address space for the data and instructions stored in system memory and used by a software process is divided into pages of a given size. The virtual pages are mapped to frames of physical memory. Mappings of virtual addresses to physical addresses keep track of where virtual pages are stored in the physical memory. These mappings are stored in a page table and this page table is stored in memory. A translation look-aside buffer (TLB), which is also a cache, stores a subset of the page table.

The TLB resides between a processor and a given level of the cache hierarchy. Alternatively, a TLB resides between two levels of the system memory hierarchy. In use, the TLB is accessed with a virtual address of a given memory access request to determine whether the TLB contains an associated physical address for a memory location holding requested data. In some cases, multiple processors share the same page table. When a given processor processes instructions by a software application to modify a subset or all of the mappings in the page table, the given processor sends a maintenance request as a broadcast message to other processors in the computing system. The maintenance request includes an indication that the receiving processors are to invalidate a range of mappings in a corresponding TLB.

After issuing the maintenance request, the given processor waits for an acknowledgement from the other processors in the computing system before it proceeds to subsequent instructions. Because such activities cause a delay in the processing of instructions, the maintenance requests are typically processed with a high priority by the receiving processors. When processing the maintenance request, a local instruction stream being processed on the receiving processor is blocked while the maintenance request is serviced. At times, an instruction specifying to invalidate a range of mappings beginning at a particular start address also indicates a range larger than the size of the TLB. The TLB is searched multiple times to determine which TLB entries to invalidate, and the receiving processor is unable to achieve forward progress on the local instruction stream. An indication of a denial-of-service may be sent to a software application being run on the receiving processor.

In view of the above, efficient methods and mechanisms for efficiently performing maintenance on a cache are desired.

SUMMARY

Systems and methods for efficiently performing maintenance on a cache are contemplated. In various embodiments, a computing system includes a memory, multiple processors, and a communication fabric for transferring requests and responses between the multiple processors. The processors are capable of generating maintenance requests for invalidating a range of virtual-to-physical mappings in a given translation lookaside buffer (TLB). When a given processor receives a maintenance request via the communication fabric, control logic in a corresponding cache controller determines a first latency to invalidate entries of the TLB based on a number of addresses in the range. In some examples, the maintenance request indicates a number of pages to invalidate, and the cache controller equates the number of pages to a number of TLB entries. In one example, the cache controller determines a number of clock cycles to invalidate a single entry in the TLB and multiplies this number by the number of addresses in the range. The cache controller also determines a second latency to invalidate each of the TLB entries.

In one example, the maintenance request indicates invalidating 1,024 pages. In some designs, invalidating a TLB entry consumes one clock cycle. In such a case, the first latency is 1,024 clock cycles. If the TLB has 256 entries, then the second latency is 256 clock cycles. Rather than traverse each of the 1,024 addresses corresponding to the 1,024 pages, the cache controller instead searches each of the 256 TLB entries to determine whether an address stored in a TLB entry is within the range of addresses to invalidate. If so, the cache controller invalidates the TLB entry. Therefore, the latency for processing the maintenance request is 256 clock cycles, rather than 1,024 clock cycles. This alternative approach is referred to as "long invalidation." In other words, when the cache controller determines the first latency is greater than the second latency, the cache controller determines to use long invalidation to process the request for invalidating multiple entries of the TLB in order to reduce the latency for processing the maintenance request. As described, to perform long invalidation, the cache controller determines for each TLB entry whether a virtual address portion (i.e., a portion of a virtual address) stored in a TLB entry is within the range of addresses to invalidate. The cache controller invalidates the TLB entry when the cache controller determines the virtual address portion stored in the entry is within the range.

During long invalidation, the cache controller or other control logic selects a TLB entry, reads the contents of the TLB entry to obtain a virtual address and a page size, and determines the portion of addresses to compare based on the page size stored in the selected TLB entry. For example, when the page size stored in the selected TLB entry is 4 kilobytes (KB), the bits 11 to 0 of the virtual address are used as the offset for identifying a particular byte in the 4 KB page. The bits 19 to 12 of the virtual address for the 256-entry TLB are used as an index for identifying a particular set within the TLB. When the page size stored in the selected TLB entry is 64 kilobytes (KB), the bits 15 to 0 of the virtual address are used as the offset for identifying a particular byte in the 64 KB page. The bits 23 to 16 of the virtual address for the 256-entry TLB are used as an index. Other page sizes are possible and contemplated. The portion of the virtual address that is not part of the offset and not used as an index is compared to each of the upper and lower bounds of the range of addresses to invalidate. Therefore, when the TLB stores virtual addresses for multiple supported page sizes, the page size corresponding to a TLB entry is used to determine which bits are the index and which bits are used for comparisons. For example, in some embodiments the page size is read from the TLB entry itself.

In contrast to the long invalidation, when the cache controller determines the first latency is less than the second latency, the cache controller determines to use an approach referred to as "short invalidation" to process the request for invalidating multiple entries of the TLB. The cache controller determines for each virtual address in the range whether a virtual address portion of the virtual address is stored in the TLB. If so, the cache controller or other control logic invalidates the TLB entry. When multiple page sizes are supported, the control logic traverses through each supported page size for each virtual address in the range until either a hit occurs in the TLB or the searches are exhausted for each of the supported page sizes. For each page size, the control logic determines which bits are the index and which bits are used for comparisons in the virtual addresses.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
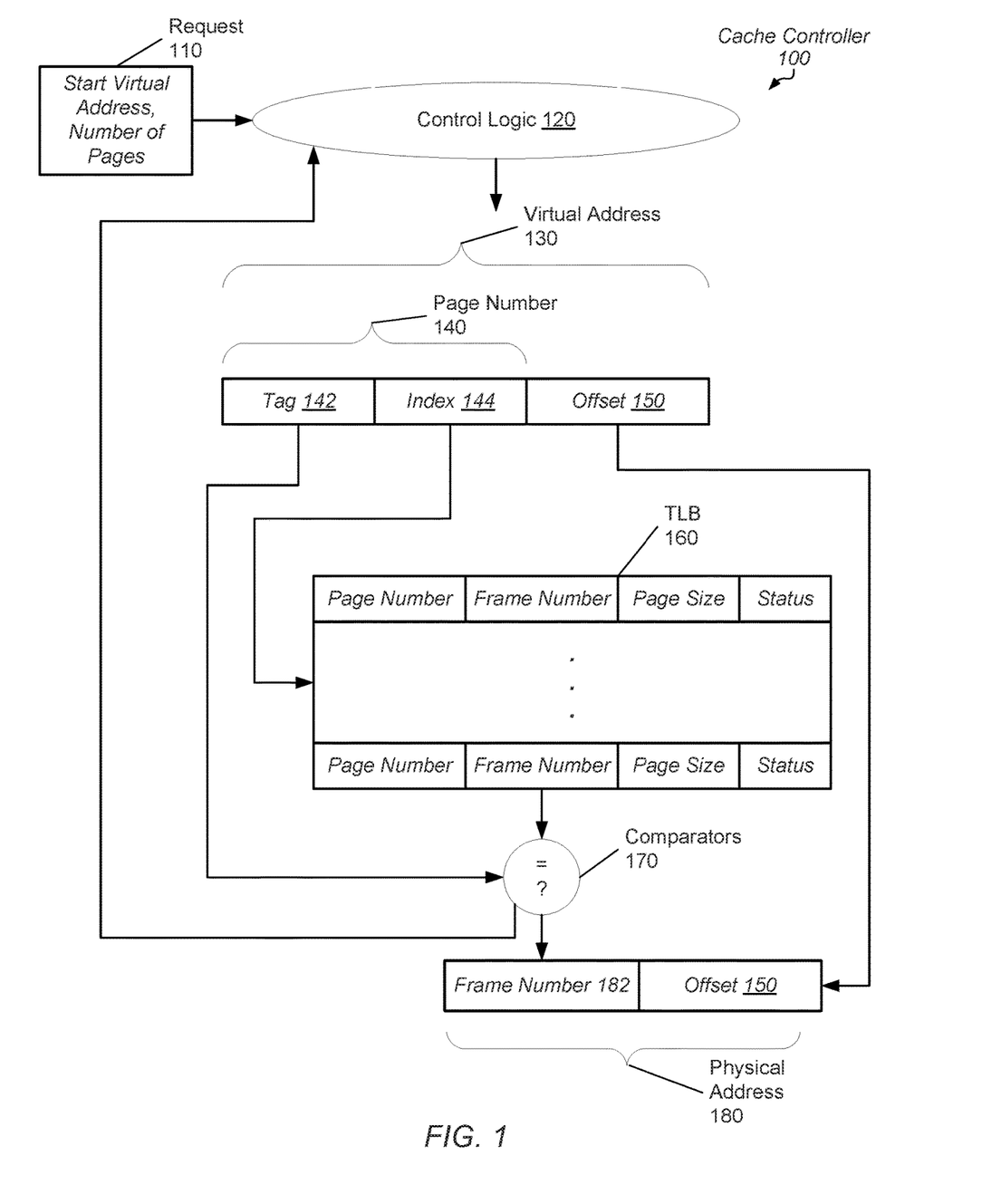
FIG. 1 is a block diagram of one embodiment of a cache controller.

Referring to FIG. 1, a generalized block diagram of one embodiment of a cache controller 100 is shown. As shown, cache controller 100 includes at least a translation lookaside buffer (TLB) 160 for storing virtual-to-physical address mappings and control logic 120. In various embodiments, cache controller 100 receives virtual addresses from processing logic in a processor, translates the virtual address 130 to a physical address 180 by accessing the TLB 160, and sends the physical address 180 to a data cache, which is not shown here for ease of illustration.

Virtual address 130 includes a page number 140 and an offset 150. The offset 150 is used to specify a particular byte in a page. The page number 140 is a linear or "virtual" address portion used by processing logic in a processor when generating memory access requests. When the TLB 160 stores data using a set-associative cache organization, the page number 140 is divided into a tag 142 and an index 144. However, when the TLB 160 stores data using a direct-mapped cache organization, the entire page number 140 is used as an index. Data is stored in the TLB 160 in various manners. In many cases, the stored data is partitioned into cache lines. In some designs, each row of the TLB 160 stores data using a set-associative cache organization, whereas, in other designs, data is stored in a direct-mapped cache organization.

Each row in the TLB 160 stores a page number of a virtual address and a corresponding frame number of a physical address. In addition, a page size is stored when the TLB 160 is used to store multiple different page sizes at the same time. The status field stores various types of metadata such as a valid bit, a replacement state, and so forth.

One or more of the tag 142 and the index 144 of the virtual address 130 are used to search the TLB 160. When a set-associative cache organization is used, comparators 170 compare the tag portions of the page numbers read from a particular set in the TLB 160 specified by the index 144. When a hit occurs, or there is a match between the page number 140 and a page number stored in an entry of the TLB 160, a frame number is read out of the TLB entry and concatenated with the offset 150 to form the physical address 180. The physical address 180 is used to index into the data cache.

Additionally, the cache controller 100 processes maintenance requests such as invalidating multiple entries of the TLB 160. For example, a command, instruction, request or other sends an indication to the cache controller 100 to invalidate multiple mappings (entries) of the TLB 160. For example, a context switch or other change occurs to cause a portion of a page table stored in system memory to be removed or replaced. As shown, a request 110 includes a start virtual address and a number of pages to invalidate. Typically, the number of pages equates to a number of entries in the TLB 160.

The functionality of control logic 120 is implemented by hardware, software, or a combination. For example, control logic 120 includes one or more of combinatorial logic, finite state machines, control and status registers and an interface to firmware or other software for running particular subroutines when particular values are stored in a subset of the control and status registers. When control logic 120 receives the request 110, control logic 120 determines a first latency to invalidate entries of the TLB 160 based on the number of pages to invalidate as specified by the request 110. The number of pages to invalidate corresponds to a number of virtual addresses in a range of virtual addresses to invalidate. In one example, the control logic 120 determines a number of clock cycles to invalidate a single entry in the TLB 160 and multiplies this number by the number of virtual addresses in the range and the number of supported page sizes to simultaneously store in the TLB 160.

In one example, the request 110 indicates invalidating 1,024 pages. In some designs, invalidating a TLB entry consumes one clock cycle. In such a case, the latency so far is 1,024 clock cycles. If the TLB 160 supports storing virtual addresses of multiple page sizes at the same time, then the latency is multiplied the number of supported page sizes. For example, in some designs, the TLB 160 supports simultaneous storage of five pages sizes such as 16 KB pages, 64 KB pages, 2 megabyte (MB) pages, 32 MB pages and 512 MB pages. In these designs, the first latency is 1,024 clock cycles times 5 supported page sizes, or 5,120 clock cycles.

The control logic 120 also determines a second latency to invalidate each of the TLB entries. If the TLB 160 has 256 entries, then the second latency is 256 clock cycles. Rather than consume 5,120 clock cycles to process the request 110, instead searches each of the 256 entries in the TLB 160 to determine whether an address stored in a TLB entry is within the range of addresses to invalidate. If so, the control logic 160 invalidates the TLB entry. Therefore, the latency for processing the maintenance request is 256 clock cycles, rather than 5,120 clock cycles.

The above approach is referred to as "long invalidation." In other words, when the control logic 120 determines the first latency is greater than the second latency, the control logic 120 determines to use long invalidation to process the request 110 for invalidating multiple entries of the TLB 160 in order to reduce the latency for processing the request 110.

During long invalidation, the control logic 120 selects an entry, such as beginning with the first entry, of the TLB 160, reads the contents of the TLB entry to obtain a virtual address portion, such as the page number, and a page size. Afterward, the control logic 120 determines the portion of addresses to compare based on the page size stored in the selected TLB entry of TLB 160. For example, when the page size stored in the selected TLB entry is 4 kilobytes (KB), the bits 11 to 0 of the virtual address are used as the offset 150 for identifying a particular byte in the 4 KB page. The bits 19 to 12 of the virtual address are used as an index for identifying a particular set within the TLB 160.

The portion of the virtual address without the offset and TLB index is compared to each of the upper and lower bounds of the range of addresses to invalidate. Therefore, when the TLB 160 stores virtual addresses for multiple supported page sizes, the page size has to be read out from the selected TLB entry. The page size determines which bits are the index and which bits are used for comparisons.

In contrast to the long invalidation, when the control logic 120 determines the first latency is less than the second latency, the control logic 120 determines to use an approach referred to as "short invalidation" to process the request 110 for invalidating multiple entries of the TLB 160. The control logic 120 determines for each virtual address in the range whether a virtual address portion of the virtual address, such as the page number 140, is stored in the TLB 160. If so, the control logic 120 invalidates the TLB entry. When multiple page sizes are supported, the control logic traverses through each supported page sizes until either a hit occurs in the TLB 160 or the searches are exhausted for each of the supported page sizes. For each page size, the control logic 120 determines which bits are the index and which bits are used for comparisons in the virtual addresses.

Figure 2:
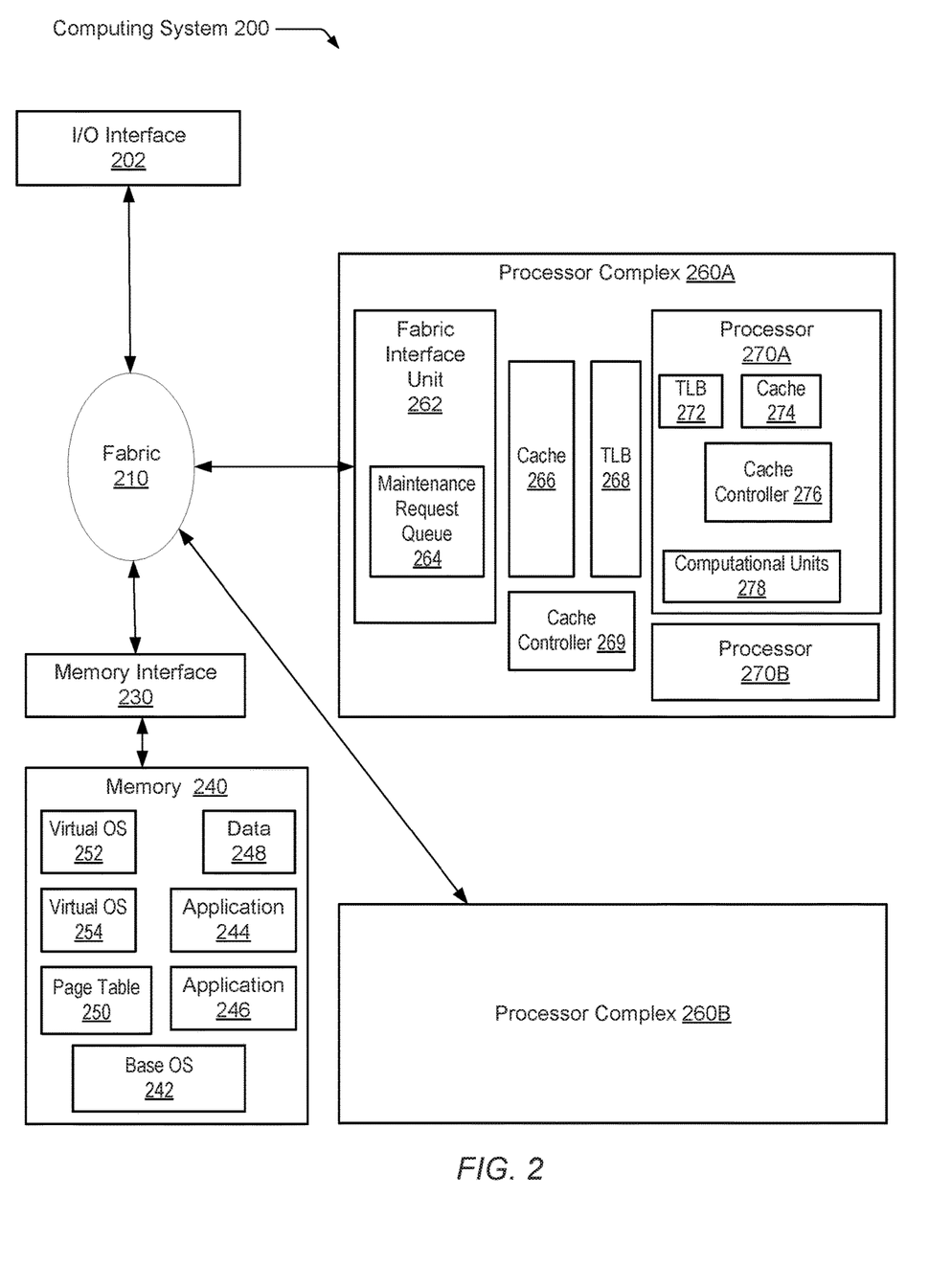
FIG. 2 is a block diagram of one embodiment of a computing system.

Referring to FIG. 2, a generalized block diagram of one embodiment of a computing system 200 is shown. As shown, a communication fabric 210 routes traffic between the input/output (I/O) interface 202, the memory interface 230, and the processor complexes 260A-260B. In various embodiments, the computing system 200 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, power managers, and so forth are not shown in FIG. 2 for ease of illustration. It is also noted that the number of components of the computing system 200 (and the number of subcomponents for those shown in FIG. 2, such as within each of the processor complexes 260A-260B) vary from embodiment to embodiment. The term "processor complex" is used to denote a configuration of one or more processor cores using local storage, such as a shared cache memory subsystem, and capable of processing a workload together.

In various embodiments, different types of traffic flows independently through the fabric 210. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 210 may also be packet-based, and may be hierarchical with bridges, cross bar, point-to-point, or other interconnects.

In some embodiments, the memory interface 230 uses at least one memory controller and at least one cache for the off-chip memory, such as synchronous DRAM (SDRAM). The memory interface 230 stores memory requests in request queues, uses any number of memory ports, and uses circuitry capable of interfacing to memory 240 using one or more of a variety of protocols used to interface with memory channels used to interface to memory devices (not shown). In various embodiments, one or more of the memory interface 230, an interrupt controller (not shown), and the fabric 210 uses control logic to ensure coherence among the different processor complexes 260A-260B and peripheral devices.

As shown, memory 240 stores applications 244 and 246. In an example, a copy of at least a portion of application 244 is loaded into an instruction cache in one of the processors 270A-270B when application 244 is selected by the base operating system (OS) 242 for execution. Alternatively, one of the virtual (guest) OSes 252 and 254 selects application 244 for execution. Memory 240 stores a copy of the base OS 242 and copies of portions of base OS 242 are executed by one or more of the processors 270A-270B. Data 248 represents source data for applications in addition to result data and intermediate data generated during the execution of applications.

A virtual address space for the data stored in memory 240 and used by a software process is typically divided into pages of a prefixed size. The virtual pages are mapped to frames of physical memory. The mappings of virtual addresses to physical addresses where virtual pages are loaded in the physical memory are stored in page table 250. Each of translation look-aside buffers (TLBs) 268 and 272 stores a subset of page table 250.

In some embodiments, the components 262-278 of the processor complex 260A are similar to the components in the processor complex 260B. In other embodiments, the components in the processor complex 260B are designed for lower power consumption, and therefore, include control logic and processing capability producing less performance. For example, supported clock frequencies may be less than supported clock frequencies in the processor complex 260A. In addition, one or more of the processors in processor complex 260B may include a smaller number of execution pipelines and/or functional blocks for processing relatively high power consuming instructions than what is supported by the processors 270A-270B in the processor complex 260A.

As shown, processor complex 260A uses a fabric interface unit (FIU) 262 for providing memory access requests and responses to at least the processors 270A-270B. Processor complex 260A also supports a cache memory subsystem which includes at least cache 266. In some embodiments, the cache 266 is a shared off-die level two (L2) cache for the processors 270A-270B although an L2 cache is also possible and contemplated.

In some embodiments, the processors 270A-270B use a homogeneous architecture. For example, each of the processors 270A-270B is a general-purpose processor, such as a central processing unit (CPU), which utilizes circuitry for executing instructions according to a predefined general-purpose instruction set. Any of a variety of instruction set architectures (ISAs) is selected. In some embodiments, each core within processors 270A-270B supports the out-of-order execution of one or more threads of a software process and include a multi-stage pipeline. The processors 270A-270B may support the execution of a variety of operating systems.

In other embodiments, the processors 270A-270B use a heterogeneous architecture. In such embodiments, one or more of the processors 270A-270B is a highly parallel data architected processor, rather than a CPU. In some embodiments, these other processors of the processors 270A-270B use single instruction multiple data (SIMD) cores. Examples of SIMD cores are graphics processing units (GPUs), digital signal processing (DSP) cores, or otherwise.

In various embodiments, each one of the processors 270A-270B uses one or more cores and one or more levels of a cache memory subsystem. The processors 270A-270B use multiple one or more on-die levels (L1, L2, L2 and so forth) of caches for accessing data and instructions. If a requested block is not found in the on-die caches or in the off-die cache 266, then a read request for the missing block is generated and transmitted to the memory interface 230 via fabric 210. When one of applications 244-246 is selected for execution by processor complex 260A, a copy of the selected application is retrieved from memory 240 and stored in cache 266 of processor complex 260A. In various embodiments, each of processor complexes 260A-260B utilizes linear addresses (virtual addresses) when retrieving instructions and data from caches 274 and 266 while processing applications 244-246.

Each of the processors 270A-270B is capable of generating maintenance requests for modifying a subset or all of the virtual-to-physical mappings in one or more of TLBs 268 and 272. The maintenance request is one of a request, a command, an instruction, or other. These maintenance requests are broadcast to each other processor. When processing complex 260A receives a maintenance request via fabric 210, in an embodiment, FIU 262 stores the received maintenance request in the maintenance request queue 264.

In an embodiment, FIU 262 performs pre-decoding of the received maintenance request to determine it is a maintenance request. Afterward, FIU 262 sends the maintenance request to processor 270A, in one example. One or more of the FIU 262, the cache controller 276, the cache controller 269, and a decode unit among the computation units 278 determines the type of the maintenance request. For example, different types of maintenance requests are used for invalidating entries in the instruction cache, for invalidating entries in a TLB and for synchronizing page table updates by ensuring no older virtual-to-physical mappings are present in computing system 200.

The received maintenance request is processed by sending it to one or more of the cache controller 276, the cache controller 269, and the computation units 278. The processing of the one or more maintenance requests may stall the processing of one or more of software applications 244-246. In one example, a fetch control unit and a memory management unit within computation units 278 becomes blocked due to accesses to the instruction cache, the instruction translation lookaside buffer (TLB) or the data TLB.

Control logic in one or more one or more of the cache controller 276, the cache controller 269, and the computation units 278 is selected for processing a maintenance request indicating to invalidate multiple entries of one of the TLB 268 and TLB 272. The control logic determines whether to use steps of a long invalidation or steps of a short invalidation to invalidate the multiple entries of the selected TLB based on latencies to perform each of the long invalidation and the short invalidation. After the selected steps are completed, one or more of software applications 244-246 continue processing on computation units 278.

Figure 3:
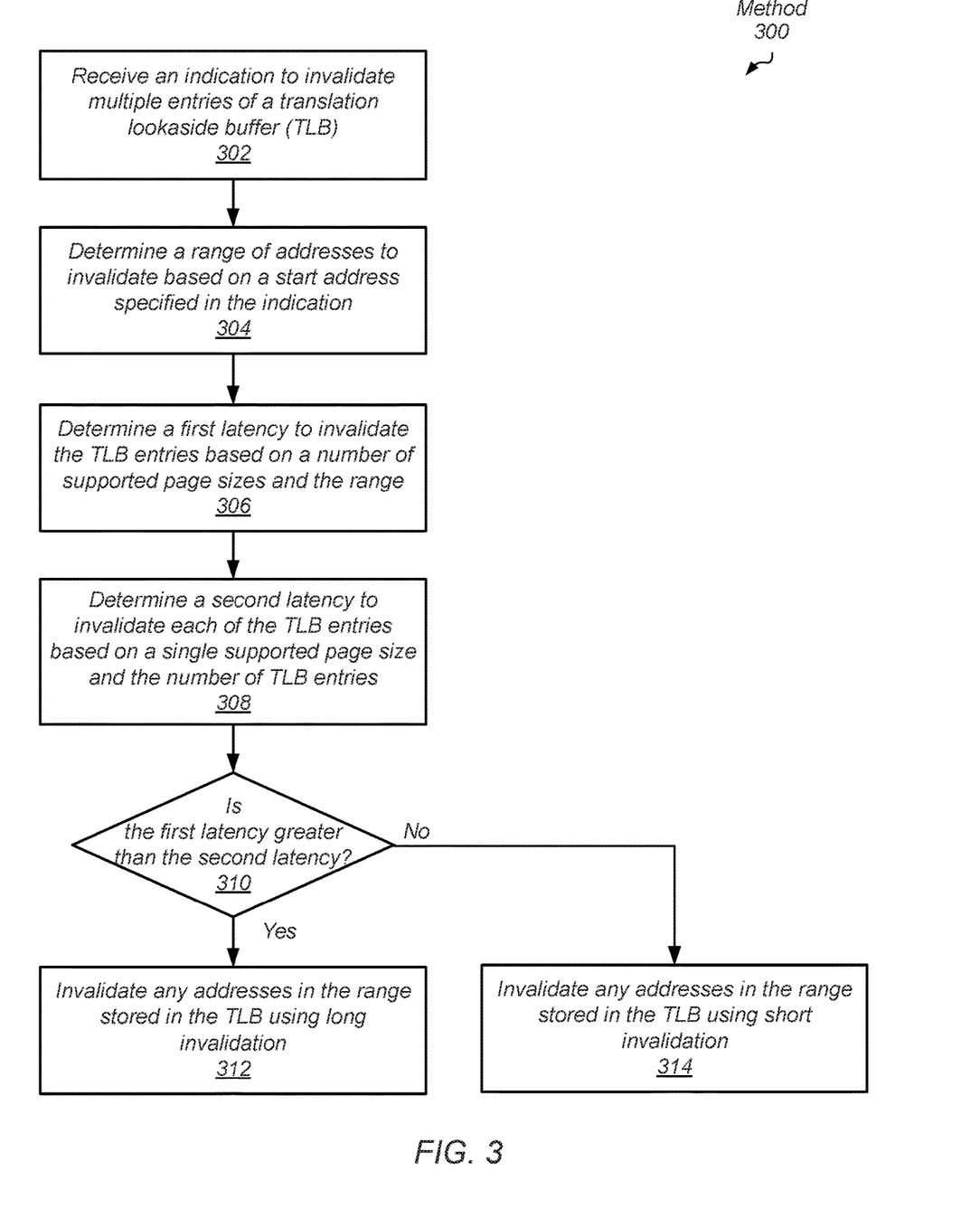
FIG. 3 is a flow diagram of one embodiment of a method for efficiently performing maintenance on a cache.

Turning now to FIG. 3, a generalized flow diagram of one embodiment of a method 300 for efficiently performing maintenance on a cache is shown. For purposes of discussion, the steps in this embodiment (as well as for FIGS. 4-6) are shown in sequential order. However, in other embodiments some steps may occur in a different order than shown, some steps may be performed concurrently, some steps may be combined with other steps, and some steps may be absent.

A cache controller or other control logic receives an indication to invalidate multiple entries of a translation lookaside buffer (TLB) (block 302). In some designs, the indication is an instruction, whereas, the in other designs, the indication is a command or maintenance request. The control logic determines a range of addresses to invalidate based on a start address specified in the indication (block 304). In addition, the indication includes a number of pages to invalidate. In many examples, the number of pages is equated to a number of TLB entries, since each virtual address stored in a TLB entry identifies a particular page of a page table stored in system memory.

The control logic determines a first latency to invalidate the TLB entries based on a number of supported page sizes and the range (block 306). In one example, the maintenance request indicates invalidating 1,024 pages. In some designs, invalidating a TLB entry consumes one clock cycle. In such a case, the first latency is 1,024 clock cycles if a single page size is supported for storing virtual addresses in the TLB. However, if the TLB supports storing virtual addresses of multiple page sizes, then the latency is multiplied the number of supported page sizes. For example, in some designs, the TLB supports five pages sizes such as a 16 KB pages, 64 KB pages, 2 megabyte (MB) pages, 32 MB pages and 512 MB pages. In these designs, the first latency is 1,024 clock cycles times 5 supported page sizes, or 5,120 clock cycles.

The control logic determines a second latency to invalidate each of the TLB entries based on a single supported page size and the number of TLB entries (block 308). In some designs, invalidating a TLB entry consumes one clock cycle. If the TLB has 256 entries, then the second latency is 256 clock cycles. If the first latency is greater than the second latency ("yes" branch of the conditional block 310), then the control logic invalidates any addresses in the range stored in the TLB using long invalidation (block 312). Using the earlier example, rather than traverse each of the 1,024 addresses corresponding to the 1,024 pages, the control logic instead searches each of the 256 TLB entries to determine whether a virtual address stored in a TLB entry is within the range of addresses to invalidate. If so, the cache controller invalidates the TLB entry. Therefore, the latency for processing the received indication is 256 clock cycles, rather than 5,120 clock cycles. This alternative approach is referred to as "long invalidation."

If the first latency is less than the second latency ("no" branch of the conditional block 310), then the control logic invalidates any addresses in the range stored in the TLB using short invalidation (block 314). For example, if invalidating a TLB entry consumes one clock cycle, and the received indication indicates invalidating 40 pages and there are five supported page sizes, then the first latency is 40×1×5=200 clock cycles. This first latency is less than the second latency of 256 clock cycles for the 256-entry TLB. In such a case, the cache controller determines to use an approach referred to as "short invalidation" to process the request for invalidating multiple entries of the TLB. The cache controller determines for each virtual address in the range whether a virtual address portion of the virtual address is stored in the TLB. If so, the cache controller or other control logic invalidates the TLB entry.

Figure 4:
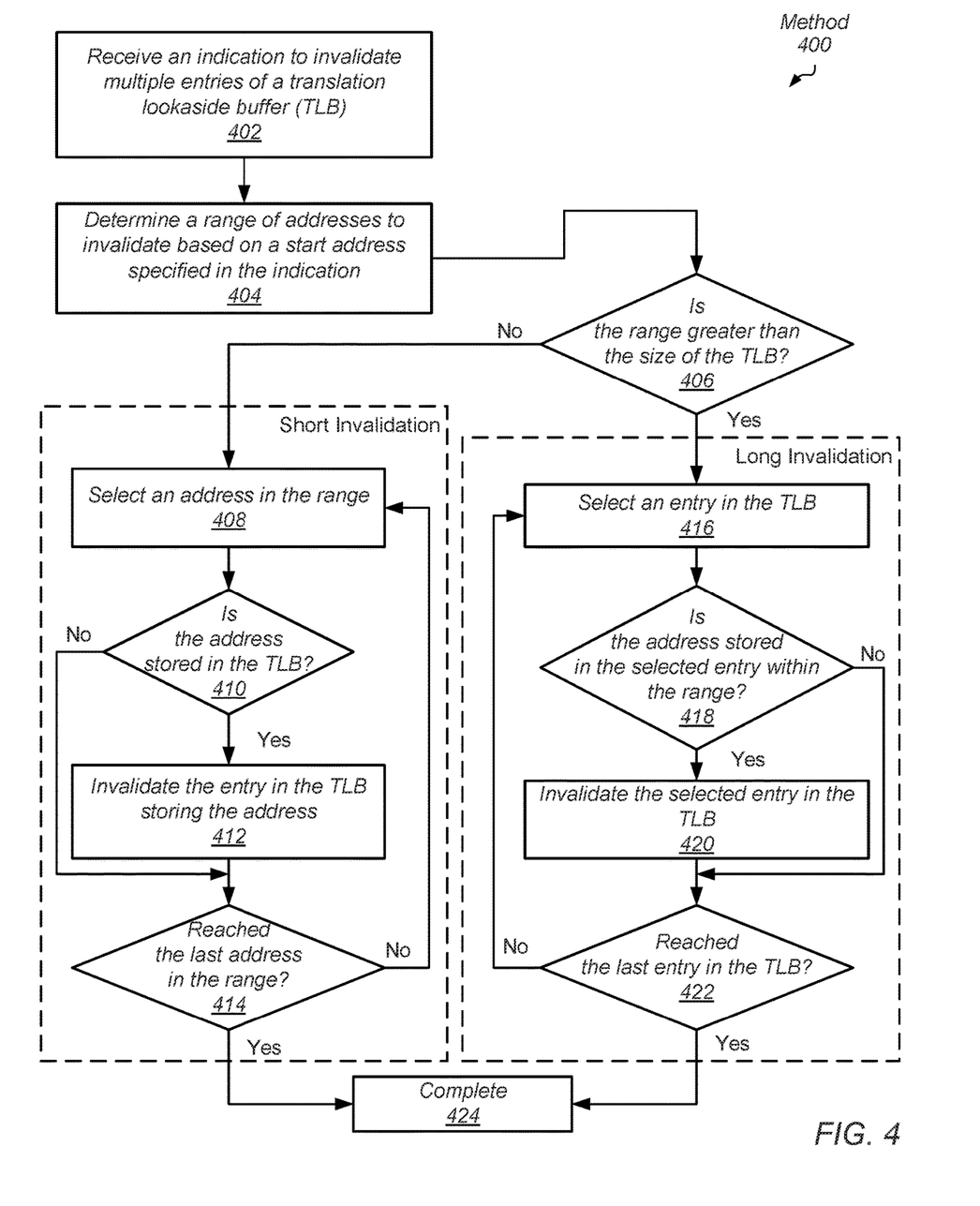
FIG. 4 is a flow diagram of one embodiment of a method for efficiently performing maintenance on a cache.

Referring to FIG. 4, a generalized flow diagram of one embodiment of a method 400 for efficiently performing maintenance on a cache is shown. A cache controller or other control logic receives an indication to invalidate multiple entries of a translation lookaside buffer (TLB) (block 402). In some designs, the indication is an instruction, whereas, the in other designs, the indication is a command or maintenance request. The control logic determines a range of addresses to invalidate based on a start address specified in the indication (block 404). The indication includes a number of pages to invalidate. In many examples, the number of pages is equated to a number of TLB entries, since each virtual address stored in a TLB entry identifies a particular page of a page table stored in system memory.

As described earlier, in some embodiments, the control logic determines a first latency to invalidate the TLB entries based on a number of supported page sizes and the range. Here, the number of supported pages sizes is one to simplify the description, although, in various embodiments, the TLB supports storing virtual addresses for multiple different page sizes at the same time. If the range is greater than the size of the TLB ("yes" branch of the conditional block 406), then the control logic determines to use an approach referred to as "long invalidation" to process the request for invalidating multiple entries of the TLB. For example, the blocks 416 to 422 of method 400 correspond to the long invalidation, whereas, the blocks 408 to 414 of method 400 correspond to the short invalidation.

For the long invalidation, the control logic selects an entry in the TLB (block 416). If the address stored in the selected entry is not within the range ("no" branch of the conditional block 418), then control flow of method 400 moves to the conditional block 422 where it is determined whether the last entry in the TLB is reached. If the address stored in the selected entry is within the range ("yes" branch of the conditional block 418), then the selected entry in the TLB is invalidated (block 420). For example, a valid bit is negated for the selected TLB entry. If the last entry in the TLB is not reached ("no" branch of the conditional block 422), then control flow of method 400 returns to the block 416 where another TLB entry is selected. If the last entry in the TLB is reached ("yes" branch of the conditional block 422), then the invalidation request completes (block 424).

If the range is less than the size of the TLB ("no" branch of the conditional block 406), then the control logic determines to use an approach referred to as "short invalidation" to process the request for invalidating multiple entries of the TLB. For the short invalidation, the control logic selects a virtual address in the range (block 408). If the selected virtual address is not stored in the TLB ("no" branch of the conditional block 410), then control flow of method 400 moves to the conditional block 414 where it is determined whether the last virtual address in the range is reached. If the selected virtual address is stored in the TLB ("yes" branch of the conditional block 410), then the hit entry in the TLB is invalidated (block 412).

If the last virtual address in the range is not reached ("no" branch of the conditional block 414), then control flow of method 400 returns to the block 408 where another virtual address in the range is selected. If the last virtual address in the range is reached ("yes" branch of the conditional block 414), then the invalidation request completes (block 424).

Figure 5:
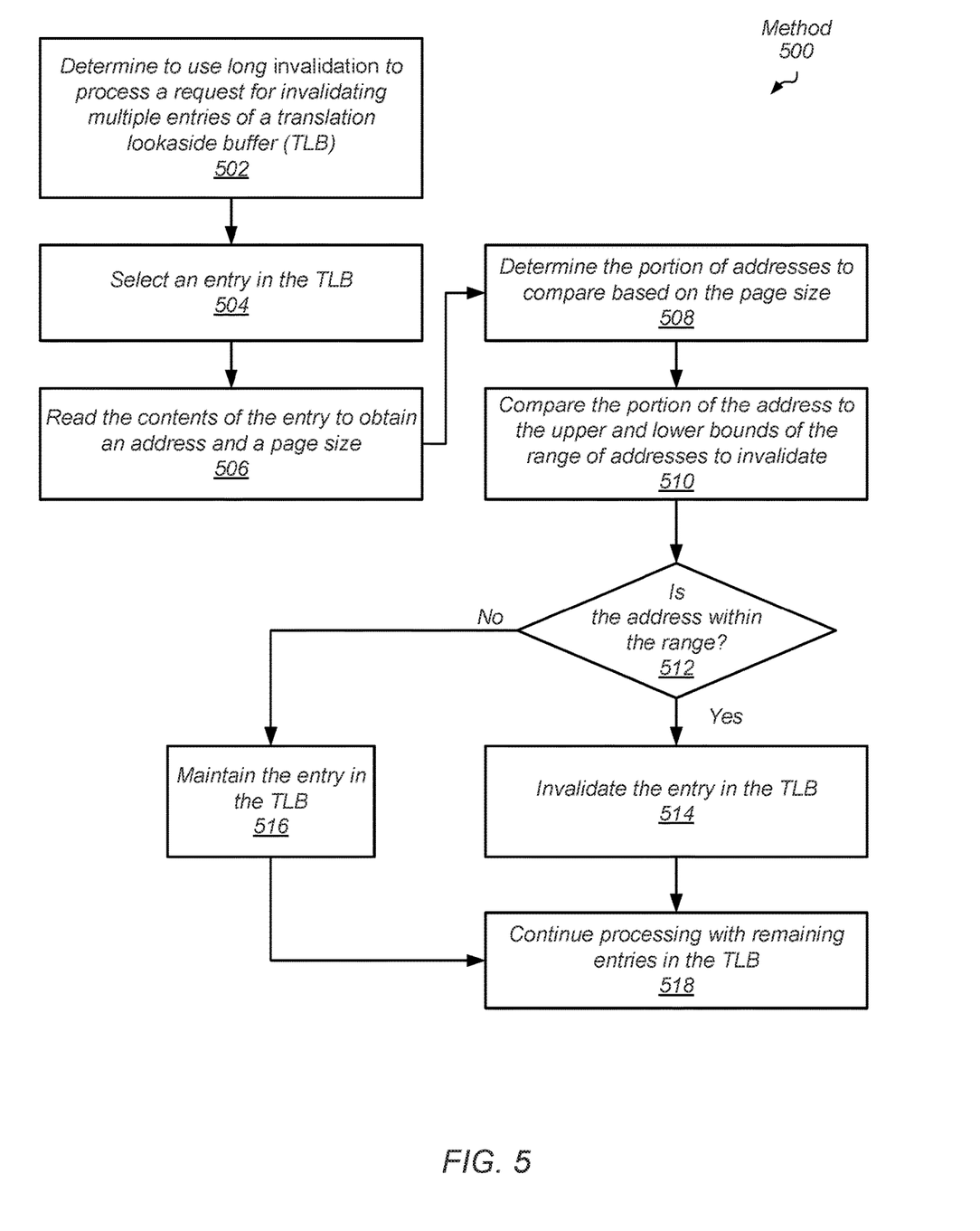
FIG. 5 is a flow diagram of one embodiment of a method for efficiently performing maintenance on a cache.

Referring to FIG. 5, a generalized flow diagram of one embodiment of a method 500 for efficiently performing maintenance on a cache is shown. Control logic in a cache controller or other control logic determines to use long invalidation to process a request for invalidating multiple entries of a translation lookaside buffer (TLB) (block 502). The control logic selects an entry in the TLB (block 504). The contents of the entry are read out to obtain an address and a page size (block 506).

The control logic determines the portion of addresses to compare based on the page size (block 508). For example, in many designs, the TLB supports storing virtual addresses corresponding to multiple page sizes at the same time. In some designs, the TLB supports five pages sizes such as a 16 KB pages, 64 KB pages, 2 MB pages, 32 MB pages and 512 MB pages. A variety of other numbers of page sizes and other page sizes is supported in other designs. The particular page size corresponding to the virtual address read out from the TLB entry is also stored in the TLB entry.

The control logic determines the portion of addresses to compare based on the page size stored in the selected TLB entry. For example, when the page size stored in the selected TLB entry is 4 KB, the bits 11 to 0 of the virtual address are used as the offset for identifying a particular byte in the 4 KB page. The bits 19 to 12 of the virtual address for the 256-entry TLB are used as an index for identifying a particular set within a set-associative TLB or for identifying a particular entry in a direct-mapped TLB. These bits are also used for comparison with an upper bound and a lower bound of the range of virtual addresses. In an embodiment, the upper bound is the start virtual address provided in the received indication to invalidate multiple TLB entries, and the lower bound is the sum of the start virtual address and the number of pages to invalidate. The sum is performed based on the page size retrieved from the selected TLB entry.

If the virtual address portion stored in the selected TLB entry is not within the range ("no" branch of the conditional block 512), then the contents of the selected TLB entry are maintained in the TLB (block 516). If the virtual address portion stored in the selected TLB entry is within the range ("yes" branch of the conditional block 512), then the selected TLB entry is invalidated. Processing continues with the remaining entries in the TLB (block 518). For example, the processing uses the steps described above for blocks 504-516 for each other entry in the TLB.

Figure 6:
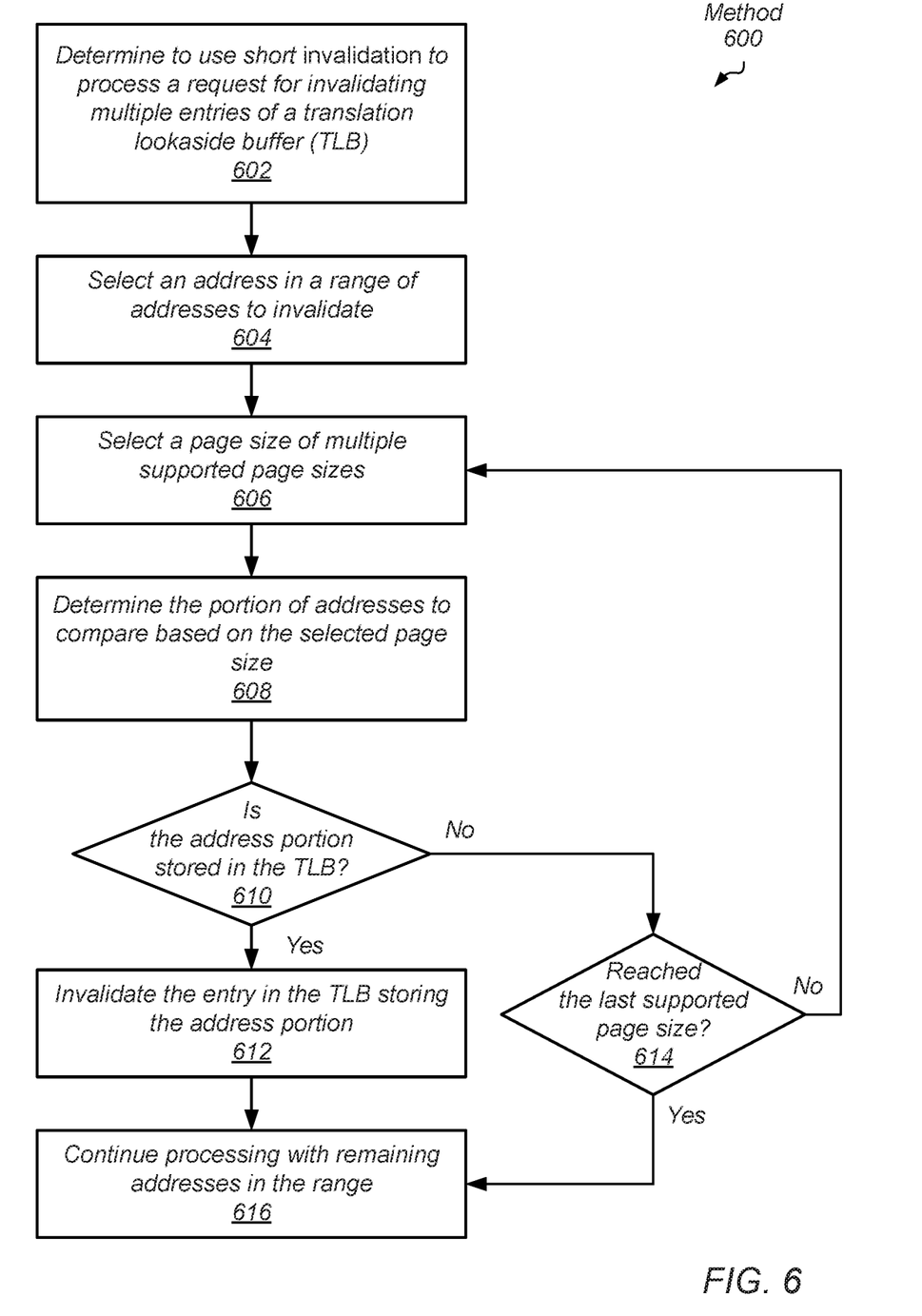
FIG. 6 is a flow diagram of one embodiment of a method for efficiently performing maintenance on a cache.

Referring to FIG. 6, a generalized flow diagram of one embodiment of a method 600 for efficiently performing maintenance on a cache is shown. Control logic in a cache controller or other control logic determines to use short invalidation to process a request for invalidating multiple entries of a translation lookaside buffer (TLB) (block 602). The control logic selects a virtual address in the range (block 604). The control logic selects a page size of multiple supported page sizes (block 606). As described earlier, in many designs, the TLB supports storing virtual addresses corresponding to multiple page sizes at the same time. In some designs, the TLB supports five pages sizes such as a 16 KB pages, 64 KB pages, 2 MB pages, 32 MB pages and 512 MB pages. A variety of other numbers of page sizes and other page sizes is supported in other designs.

The control logic determines the portion of addresses to compare based on the selected page size (block 608). For example, when the selected page size is 4 KB, the bits 11 to 0 of the virtual address are used as the offset for identifying a particular byte in the 4 KB page. The bits 19 to 12 of the virtual address for the 256-entry TLB are used as an index for identifying a particular set within a set-associative TLB or for identifying a particular entry in a direct-mapped TLB. The upper bits such as bits 36 to the most significant bit of the index are used for comparisons with the virtual address stored in entries of the TLB.

If the selected virtual address portion is stored in the TLB ("yes" branch of the conditional block 610), then the contents of the hit TLB entry are invalidated (block 612). Afterward, processing continues with the remaining virtual addresses in the range (block 616). However, if the selected virtual address portion is not stored in the TLB ("no" branch of the conditional block 610), and the last supported page size is not reached ("no" branch of the conditional block 614), then control flow of method 600 returns to block 606 where another supported page size is selected. If the last supported page size is reached ("yes" branch of the conditional block 614), then processing continues with the remaining virtual addresses in the range (block 616). For example, the processing uses the steps described above for blocks 604-614 for each other address in the range.

Figure 7:
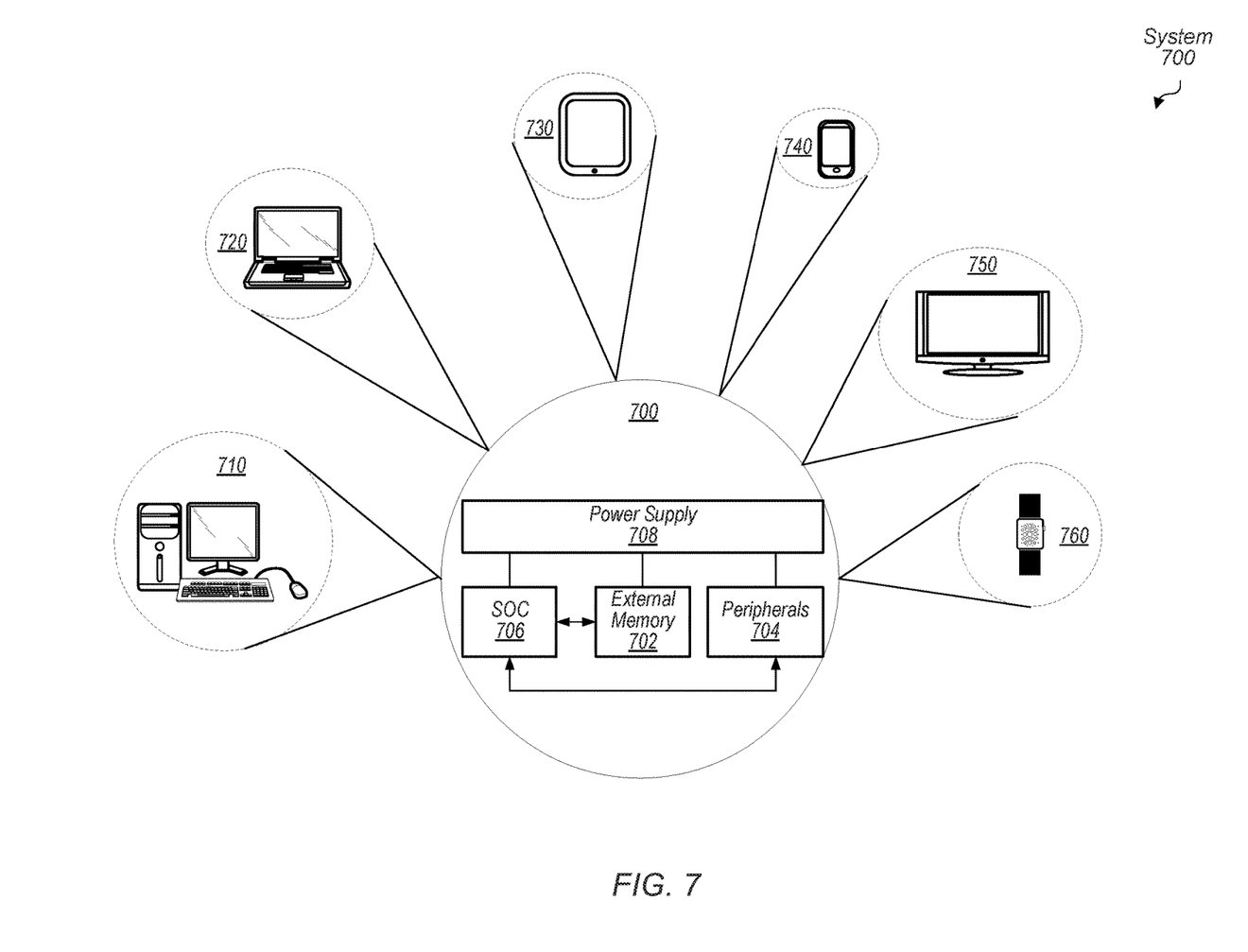
FIG. 7 is a block diagram of one embodiment of a system.

Turning next to FIG. 7, a block diagram of one embodiment of a system 700 is shown. As shown, system 700 represents chip, circuitry, components, etc., of a desktop computer 710, laptop computer 720, tablet computer 730, cell or mobile phone 740, television 750 (or set top box coupled to a television), wrist watch or other wearable item 760, or otherwise. Other devices are possible and are contemplated. In the illustrated embodiment, the system 700 includes at least one instance of a system on chip (SoC) 706 which includes multiple processors and a communication fabric. In some embodiments, SoC 706 includes components similar to cache controller 100 (of FIG. 1) and computing system 200 (of FIG. 2). In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a translation lookaside buffer (TLB) comprising a plurality of entries, each configured to store a mapping between a virtual address portion and a physical address portion; and
   logic, wherein in response to receiving an indication to invalidate a range of virtual addresses beginning at a start virtual address, the logic is configured to:
      determine a first latency to invalidate entries of the TLB based on a number of addresses in the range;
      determine a second latency to invalidate each of the plurality of entries of the TLB based on a page size and the number of the plurality of entries;
      in response to determining the first latency is greater than the second latency:
         determine for each entry of the plurality of entries of the TLB whether a virtual address portion stored in an entry is within the range; and
         invalidate an entry responsive to determining a virtual address portion stored in the entry is within the range.

2. The apparatus as recited in claim 1, wherein the logic is further configured to:
   read contents of an entry of the TLB to obtain a virtual address and a page size corresponding to a given virtual address; and
   determine a virtual address portion to use for comparisons based on the page size.

3. The apparatus as recited in claim 2, wherein the logic is further configured to compare the virtual address portion to each of an upper bound and a lower bound of the range.

4. The apparatus as recited in claim 1, wherein in response to determining the first latency is less than the second latency, the logic is further configured to:
   determine for each virtual address within the range whether a virtual address portion of the virtual address is stored in the plurality of entries of the TLB; and
   invalidate a given entry of the TLB responsive to determining a virtual address portion is stored in the given entry of the TLB.

5. The apparatus as recited in claim 1, wherein the logic is further configured to determine the first latency based at least in part on a number of page sizes in a plurality of supported page sizes.

6. The apparatus as recited in claim 5, wherein the logic is further configured to:
   select a first page size of the plurality of supported page sizes; and
   determine a first virtual address portion to use for comparisons based on the selected first page size.

7. The apparatus as recited in claim 6, wherein in response to determining the first virtual address portion is not stored in the plurality of entries of the TLB, the logic is further configured to:
   select a second page size different from the first page size of the plurality of supported page sizes; and
   determine a second virtual address portion to use for comparisons based on the selected second page size.

8. A method, comprising:
   storing a mapping between a virtual address portion and a physical address portion in each entry of a plurality of entries in a translation lookaside buffer (TLB);
   in response to receiving an indication to invalidate a range of virtual addresses beginning at a start virtual address:
      determining a first latency to invalidate entries of the TLB based on a number of addresses in the range;
      determining a second latency to invalidate each of the plurality of entries of the TLB based on a page size and the number of the plurality of entries;
      in response to determining the first latency is greater than the second latency:
         determining for each entry of the plurality of entries of the TLB whether a virtual address portion stored in an entry is within the range; and
         invalidating an entry responsive to determining a virtual address portion stored in the entry is within the range.

9. The method as recited in claim 8, further comprising:
   reading contents of a given entry of the TLB to obtain a virtual address and a page size corresponding to the virtual address; and
   determining a virtual address portion to use for comparisons based on the page size.

10. The method as recited in claim 9, further comprising comparing the virtual address portion to each of an upper bound and a lower bound of the range.

11. The method as recited in claim 8, wherein in response to determining the first latency is less than the second latency, the method further comprises:
   determining for each virtual address within the range whether a virtual address portion of the virtual address is stored in the plurality of entries of the TLB; and
   invalidating a given entry of the TLB responsive to determining the virtual address portion is stored in the given entry of the TLB.

12. The method as recited in claim 8, further comprising determining the first latency based at least in part on a number of page sizes in a plurality of supported page sizes.

13. The method as recited in claim 12, further comprising:
   selecting a first page size of the plurality of supported page sizes; and
   determining a first virtual address portion to use for comparisons based on the selected first page size.

14. The method as recited in claim 13, wherein in response to determining the first virtual address portion is not stored in the plurality of entries of the TLB, the method further comprises:
   selecting a second page size different from the first page size of the plurality of supported page sizes; and
   determining a second virtual address portion to use for comparisons based on the selected second page size.

15. An execution core comprising:
   a cache comprising a plurality of cache entries, each configured to store data;
   a plurality of computation units, each configured to:
      generate virtual addresses pointing to particular cache entries; and
      process data retrieved from the cache; and
   a translation lookaside buffer (TLB) comprising a plurality of TLB entries, each configured to store a mapping between a virtual address portion and a physical address portion; and
   a cache controller, wherein the cache controller is configured to:
      receive a virtual address from the plurality of computation units;
      retrieve a physical address mapped to the received virtual address from the TLB;
      send the physical address to the cache to retrieve data; and
      in response to receiving an indication to invalidate a range of virtual addresses beginning at a start virtual address, the cache controller is configured to:

determine a first latency to invalidate TLB entries based on a number of addresses in the range;

determine a second latency to invalidate each of the plurality of TLB entries based on a page size and the number of the plurality of entries;

in response to determining the first latency is greater than the second latency:

determine for each TLB entry whether a virtual address portion stored in a TLB entry is within the range; and invalidate a TLB entry responsive to determining a virtual address portion stored in the entry is within the range.

16. The execution core as recited in claim 15, wherein the cache controller is further configured to:

read contents of a given entry of the TLB to obtain a virtual address and a page size corresponding to the virtual address; and determine a virtual address portion to use for comparisons based on the page size.

17. The execution core as recited in claim 16, wherein the cache controller is further configured to compare the virtual address portion to each of an upper bound and a lower bound of the range.

18. The execution core as recited in claim 15, wherein in response to determining the first latency is less than the second latency, the cache controller is further configured to:

determine for each virtual address within the range whether a virtual address portion of the virtual address is stored in the plurality of entries of the TLB; and invalidate a given entry of the TLB responsive to determining the virtual address portion is stored in the given entry of the TLB.

19. The execution core as recited in claim 15, wherein the cache controller is further configured to determine the first latency based at least in part on a number of page sizes in a plurality of supported page sizes.

20. The execution core as recited in claim 19, wherein the cache controller is further configured to:

select a first page size of the plurality of supported page sizes; and determine a first virtual address portion to use for comparisons based on the selected first page size.

\* \* \* \* \*

UNITED STATES PATENT AND TRADEMARK OFFICE
CERTIFICATE OF CORRECTION

PATENT NO. : 10,725,928 B1
APPLICATION NO. : 16/243901
DATED : July 28, 2020
INVENTOR(S) : Mestan et al.

It is certified that error appears in the above-identified patent and that said Letters Patent is hereby corrected as shown below:

In the Specification

Column 8, Line 41, please delete "one or more one or more" and substitute -- one or more --.

In the Claims

Column 13, Claim 1, Line 19, please delete "an entry is within the range;" and substitute -- each said entry of the TLB is within the range; --.

Column 13, Claim 1, Line 20, please delete "an entry" and substitute -- a given entry of the TLB --.

Column 13, Claim 1, Line 21, please delete "the entry" and substitute -- the given entry --.

Column 14, Claim 8, Line 8, please delete "an entry is within the range;" and substitute -- each said entry of the TLB is within the range; --.

Column 14, Claim 8, Line 9, please delete "an entry" and substitute -- a given entry of the TLB --.

Column 14, Claim 8, Line 10, please delete "the entry" and substitute -- the given entry --.

Column 15, Claim 15, Line 9, please delete "in a TLB" and substitute -- in the TLB --.

Column 15, Claim 15, Line 11, please delete "a TLB" and substitute -- a given TLB --.

Column 15, Claim 15, Line 12, please delete "in the entry" and substitute -- in the given TLB entry --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*